(No Model.)

W. E. CLOW.
WATCHMAKER'S GAGE.

No. 600,945. Patented Mar. 22, 1898.

Witnesses:
F. S. Belt.
Belle Elliott.

Inventor:
William E. Clow,
by R. S. Dyrenforth,
his attorney

UNITED STATES PATENT OFFICE.

WILLIAM E. CLOW, OF CHICAGO, ILLINOIS.

WATCHMAKER'S GAGE.

SPECIFICATION forming part of Letters Patent No. 600,945, dated March 22, 1898.

Application filed December 3, 1896. Serial No. 614,305. (No model.)

*To all whom it may concern:*

Be it known that I, WILLIAM E. CLOW, a citizen of the United States, residing at Chicago, in the county of Cook and State of Illinois, have invented certain new and useful Improvements in Watchmakers' Gages; and I do hereby declare the following to be a full, clear, and exact description of the invention, such as will enable others skilled in the art to which it appertains to make and use the same.

This invention relates to watchmakers' gages.

The object is to produce a gage by which measurement of the length of a staff or the position of a wheel thereon may be accurately determined; furthermore, to provide a gage combining the above characteristics which shall be exceedingly simple of construction, efficient and durable in use, and which may be manufactured and sold at a nominal figure.

In a gage characterized by my invention I employ three elements—to wit, a sheath or casing, a plunger or gage-plug adapted to fit and work therein, and a disk mounted on the sheath or casing for determining the height upon the staff at which a wheel or pinion is to be located. The sheath and plunger are both reduced at their outer extremities to fit within the staff-jewel opening, and the sheath is slit longitudinally for a portion of its length for the purpose of allowing a set-screw on the disk to be turned into engagement with the plunger when the desired measurement has been secured—that is to say, when the length of the staff has been obtained—and also to hold the disk in proper position on the sheath when the point at which the pinion or wheel is to be secured is determined. The parts are to be made of any suitable material combining lightness and strength, and may be made of different sizes, so as to adapt the gage for use in connection with watches, clocks, or other pieces of machinery where it may be used.

In the accompanying drawings, forming part of this specification, and in which like letters of reference indicate corresponding parts, I have illustrated one form of embodiment of my invention, although it is to be understood that other forms of embodiment thereof may be employed without departing from the spirit of the same.

Figure 1:
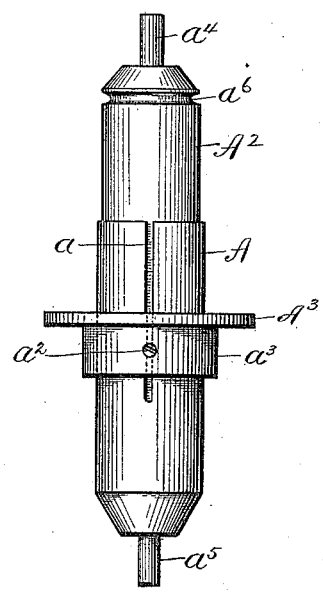
Figure 2:
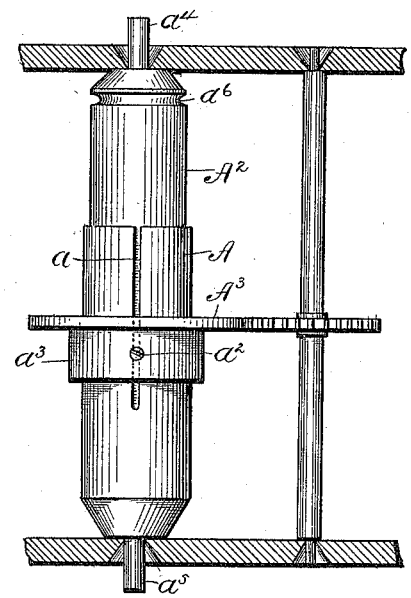

In the drawings, Figure 1 is a view in elevation, on an enlarged scale, showing the gage as it appears when ready for use. Fig. 2 is a similar view showing the manner in which the gage is to be used in measuring the length of a staff or in locating a wheel or pinion thereon.

Referring to the drawings, A designates the sheath or casing, $A^2$ the plunger or gage-plug, and $A^3$ the disk for determining the position upon a staff at which a wheel or pinion is to be located. The sheath or casing is tubular for a portion of its length to form a cylindrical casing for the plunger $A^2$, and is slit longitudinally of its length, as at $a$, for the double purpose of forming spring-jaws for clasping and holding the plunger and also of allowing a set-screw $a^2$, carried by the hub $a^3$ of the disk $A^3$, to project into the sheath and in engagement with the plunger, whereby to hold the parts at the desired adjustment.

The plunger $A^2$ is provided with a reduced portion $a^4$ and the sheath with a similar portion $a^5$, which portions are adapted to fit within the jewel or staff opening of the watch when the gage is in use. The plunger is further provided with a circumferential groove $a^6$, adapted to be engaged by a suitable instrument when the device is in position between the plates of the watch, so as to move the plunger in or out, as the case may be.

The disk $A^3$ is mounted to move freely upon the sheath A and to be held in adjusted position thereon by means of the set-screw $a^2$, as described.

The operation of the gage is as follows: When it is desired to ascertain the length of a staff—that is to say, from shoulder to shoulder—the plates of the watch or clock are assembled and the gage inserted between them, with the reduced portion $a^5$ in one of the jewel-holes or staff-openings, as the case may be, and the plunger is then moved up with its reduced portion $a^4$ in the other jewel-hole or staff-opening. The parts are then secured in adjusted position by the set-screw $a^2$ and the plates of the watch or clock are separated, leaving the gage set. When a wheel or pinion is to be arranged on a staff, the gage is placed in position as just described, with the staff carrying the wheel or pinion to be mated in position, as shown in Fig. 2. The disk A³ is then moved until it alines with the wheel or pinion on the staff adjacent to it and is then secured in place in the manner described, thereby accurately locating the position upon the staff that the wheel or pinion is to occupy.

It will be seen from the foregoing description that while this device is extremely simple of construction it will be highly efficient in use and will be thoroughly accurate and can be relied upon for making fine measurements.

Having thus fully described my invention, what I claim as new, and desire to secure by Letters Patent, is—

A gage comprising a sheath or casing slit longitudinally for a portion of its length to form spring-jaws, a plunger or gage-plug adapted to fit and work within the casing, one end of the sheath and the plunger being reduced, a disk mounted on the sheath and adapted for independent movement thereon, and a set-screw carried by the disk and extending through the slit in the casing to engage with the plunger, substantially as described.

In testimony whereof I affix my signature in presence of two witnesses.

WILLIAM E. CLOW.

Witnesses:
GEORGE E. DICKINSON,
M. M. RUST.